United States Patent [19]

Van Asbroeck et al.

[11] Patent Number: 4,829,110

[45] Date of Patent: May 9, 1989

[54] STABILIZED COMPOSITIONS BASED ON ALPHA-OLEFIN POLYMERS

[75] Inventors: Roger Van Asbroeck, Neerijse; Serge Blanc, Brussels, both of Belgium

[73] Assignee: Solvay & Cie (Société Anonyme), Brussels, Belgium

[21] Appl. No.: 932,151

[22] Filed: Nov. 18, 1986

Related U.S. Application Data

[62] Division of Ser. No. 688,953, Jan. 4, 1985, Pat. No. 4,670,493.

[30] Foreign Application Priority Data

Jan. 6, 1984 [FR] France .................. 84 00324

[51] Int. Cl.$^4$ .................. C08K 5/34; C08K 5/49; C08K 5/53; C08K 5/39
[52] U.S. Cl. .................. 524/81; 524/102; 524/120; 524/126; 524/291; 524/302; 524/394; 524/400; 524/420; 524/513
[58] Field of Search .................. 524/81, 102, 120, 126, 524/291, 394, 400, 420, 513, 302

[56] References Cited

U.S. PATENT DOCUMENTS

| | | | |
|---|---|---|---|
| 3,029,224 | 4/1962 | Fischer et al. | 524/333 |
| 3,462,389 | 8/1969 | Schulde et al. | 524/420 |
| 3,577,384 | 5/1971 | Mauz et al. | 524/291 |
| 4,075,163 | 2/1973 | Hofer et al. | 524/120 |
| 4,180,498 | 12/1979 | Spivack | 524/120 |
| 4,206,111 | 6/1980 | Valdiserri et al. | 524/120 |
| 4,349,468 | 9/1982 | Nakahara et al. | 524/302 |
| 4,670,493 | 6/1987 | Van Asbroeck et al. | 524/420 |

FOREIGN PATENT DOCUMENTS

| | | | |
|---|---|---|---|
| 774363 | 6/1971 | Belgium . | |
| 676232 | 12/1963 | Canada | 524/420 |
| 1268942 | 6/1961 | France . | |
| 2093463 | 9/1982 | United Kingdom . | |

OTHER PUBLICATIONS

F. Mitler-Hofer, "Verarbeitungs-Stabilisatoren Fürr Polyproylen", vol. 67, 1977, No. 3, pp. 151–153.

Primary Examiner—John Kight
Assistant Examiner—Kriellion Morgan
Attorney, Agent, or Firm—Spencer & Frank

[57] ABSTRACT

Stabilized compositions based on alpha-olefin polymers stabilized against degradation by oxidizing liquids, based on polymers of alpha-olefins such as propylene, containing a phenolic antioxidant, a phosphonite and a sulphur-containing stabilizer chosen from the esters derived from aliphatic polyols and alkylthiodipropionic acids and from combinations of a metal sulfide with one of these esters or with an organic polysulfide and optionally also containing an organic phosphite and an anti-acid agent. These compositions exhibit outstanding resistance to the phenomenon of oxidative degradation produced particularly by the contact with hot washing products of all kinds.

20 Claims, No Drawings

STABILIZED COMPOSITIONS BASED ON ALPHA-OLEFIN POLYMERS

This is a division of application Ser. No. 06/688,953 filed Jan. 4, 1985, now U.S. Pat. No. 4,670,493.

BACKGROUND OF THE INVENTION

1. Field of the Invention

The present invention relates to stablished compositions based on alpha-olefin polymers. It relates more particularly to the compositions based on propylene polymers stabilised against the degradation produced in contact with oxidising liquids and particularly in contact with those containing washing products.

2. Background of the Art

It is known that all polyolefins have the disadvantage of being degraded as a result of oxidation phenomena which are accelerated by various factors. This degradation results in an increase in colour and a decrease in the mechanical properties of the articles manufactured from these polyolefins.

The addition of stabilising systems containing phenolic antioxidants to the polyolefins is a known means of effectively counteracting the appearance of these phenomena.

Usually, these stabilishing systems additionally contain other compounds which frequently increase synergistically the efficiency of phenolic antioxidants. These may be, in particular, dialkyl esters of a thiodialkanoic acid, such as dilauryl and distearyl thiodipropionate, organic phosphites such as trialkyl phosphites, and cyclic diphosphites derived from pentaerythritol, phosphonites such as tetrakisphenyl diphenylenediphosphonites, as well as certain mixtures of these compounds (see for example SANDOZ Pat. No. BE-A-774,363 and Kunststoffe, vol. 67, 1977, No. 3, pages 151 to 153).

Finally, the stability may be improved further by the addition of metal salts such as calcium stearate.

Some applications of polyolefins, however, involve their being in prolonged contact at a relatively high temperature with particularly agressive media. This is the case, for example, when they are moulded in the form of components intended to equip industrial and domestic appliances, particularly pumps, washing machines and dishwashers, in which they are in the presence of hot oxidising liquids, more particularly those containing washing products and detergents containing extremely oxidising compounds.

Some known stabilising systems counteract with more or less satisfactory efficiency the degradation caused by the contact of polyolefins with some oxidising liquids. Nevertheless, none of these systems have been found capable of efficiently counteracting the degradation phenomena caused by all the types of oxidising liquids, in particular those containing any washing product, be it in solid or liquid form, and whatever its composition and its concentration of oxidising agents.

SUMMARY OF THE INVENTION

The present invention is aimed at providing new stabilised polyolefin compositions capable of withstanding the oxidising action of any oxidising liquid.

For this purpose, the invention relates to compositions stabilished against degradation by oxidising liquids, based on alpha-olefin polymers containing a phenolic antioxidant (a), a phosphonite (b) and a sulfur-containing stabiliser (c), the last-mentioned being chosen from (c1) esters derived from aliphatic polyols and alkylthiodipropionic acids (c2) combinations of a metal sulfide (c21) with an ester (c1) (c3) combinations of a metal sulfide (c21) with an organic polysulfide (c22).

DESCRIPTION OF THE PREFERRED EMBODIMENTS

The alpha-olefin polymers present in the stabilised compositions according to the invention are polymers containing at least 50 mole %, and preferably at least 75 mole % of terminally unsaturated olefins the molecule of which contains from 2 to 18 and preferably from 2 to 6 carbon atoms, such as ethylene, propylene, 1-butene, 1-pentene, methyl-1-butenes, 1-hexene, and 3- and 4-methyl-1-pentenes. The polymers in question are more particularly those containing tertiary carbons such as the highly isotactic crystalline polymers of 1-butene, of 4-methyl-1-pentene, and especially of propylene.

The polymers in question may also be copolymers of these alpha-olefins with each other and/or with diolefins containing from 4 to 18 carbon atoms, such as unconjugated aliphatic diolefins such as, for example, 1,4-hexadiene, or such as alicyclic diolefins containing an endocyclic bridge, such as, for example, dicyclopentadiene.

The polymers in question, finally, may be those known as block copolymers which consist of sequences of chain segments of variable lengths, each segment consisting of an alpha-olefin homopolymer or of a random copolymer incorporating an alpha-olefin and at least one comonomer chosen from alpha-olefins and diolefins.

The best results are obtained with polymers containing at least 50% by weight, and preferably at least 75% by weight, of propylene.

The stabilised polyolefin compositions according to the invention may also be based on mixtures of two or more polymers such as described above, and of other polymers compatible with the latter.

The polymers which can be used may be prepared according to the known methods for polymerising alphaolefins at low pressure. In particular, the highly isotactic crystalline homopolymers of propylene may be prepared in the presence of stereospecific catalyst systems based on organometallic compounds and on chlorides of titanium which has a valency lower than its maximum valency.

The phenolic antioxidant (a) present in the stabilised compositions according to the invention may be advantageously chosen from the group comprising the alkylated mono-, poly- and thiobisphenols and from the group comprising phenolic polyesters.

As examples of alkylated monophenols, mention may be made of 2,6-ditert-butyl-p-cresol and n-octadecyl (3,5-ditert-butyl-4-hydroxyphenyl)propionate.

As examples of alkylated polyphenols, mention may be made of tetrakis [methylene (3,5-ditert-butyl-4-hydroxy)dihydrocinnamate]methane, 2,2'-methylene-bis-(4-methyl-6-tert-butylphenol) terephthalate, 2,6-bis-(2'-hydroxy-3-tert-butyl-5'methylbenzyl)-4-methylphenol, tris-(3,5-ditert-butyl-4-hydroxy)benzyl isocyanurate and tris-(2,6-dimethyl-3-hydroxy-4-tert-butyl)-benzyl isocyanurate.

As examples of alkylated thiobisphenols, mention may be made of 4,4'-thiobis-6-tert-butyl-m-cresol and 4,4'-thiobis-6-tert-butyl-o-cresol.

As an example of a phenolic polyester, mention may be made of 2,2'-methylenebis-(4-methyl-6-tert-butylphenol) terephthalate.

The phenolic antioxidant (a) is preferably chosen from alkylated polyphenols and from phenolic polyesters, the best results having been recorded with tris(2,6-dimethyl-3-hydroxy-4-tert-butyl)benzyl isocyanurate and with 2,2'-methylenebis-(4-methyl-6-tert-butyl-phenol) terephthalate.

The stabilised compositions according to the invention also contain a phosphonite (b). This phosphonite may be chosen from polyphenylene diphosphonites and their substituted derivatives. Examples of such compounds appear in the SANDOZ Pat. No. BE-A-774,363. In particular, mention may be made of 4,4'-diphenylenediphosphonites and tetrakis(isooctyl), tetrakis(2,4-ditert-butylphenyl), and tetrakis(3-nonylphenyl) 4,4',4''-p-terphenylenediphosphonites.

An especially preferred phosphonite (b) is tetrakis(2,4-ditert-butylphenyl) 4,4'-diphenylenediphosphonite.

According to the invention, the stabilised compositions also contain a sulfur-containing stabiliser (c) chosen from (c1) esters derived from aliphatic polyols and alkythiodipropionic acids (c2) combinations of a metal sulfide (c21) with an ester (c1) (c3) combinations of a metal sulfide (c21) with an organic polysulphide (c22).

As examples of esters (c1) derived from aliphatic polyols and alkylthiodipropionic acids, mention may be made of octamethylene bis(3-dodecylthiopropionate), bis(ethylene-3-octadecylthiopropionate) sulfide and pentaerythritol tetrakis(3-thiododecylpropionate), the last-mentioned being particularly preferred.

The metal sulfides (c21) which may be employed in combination (c2) with the esters (c1) are sulfides of metals of Group IIa of the Periodic Table of the elements; preferably zinc sulfide is employed.

The organic polysulphides (c22) which may be employed in combination (c3) with the metal sulfides (c21) are dialkyl disulfides. As examples of preferred dialkyl disulfides, mention may be made of dilauryl disulphide and distearyl disulphide.

The use of combinations (c3) as a sulfur-containing stabiliser (c) is especially preferred.

The stabilised compositions according to the invention may also contain, if appropriate, an organic phosphite (d) and an anti-acid agent (e).

The organic phosphite (d) which may be incorporated in the stabilised compositions according to the invention may be advantageously chosen, on the one hand from trialkyl- and trialkylarylphosphites and, on the other hand, from the cyclic diphosphites derived from pentaerythritol. Mixtures of these phosphites may also be advantageously employed.

As examples of trialkyl- and trialkylarylphosphites, mention may be made of trinonyl-, tri(nonylphenyl)- and tri(2,4-ditert-butyl-5-methylphenyl)phosphites.

As examples of cyclic diphosphites derived from pentaerythritol, mention may be made of distearylpentaerythritol diphosphite and bis(2,4-ditert-butylphenyl)-pentaerythritol diphosphite.

The organic phosphite (d) is preferably chosen from cyclic diphosphites derived from pentaerythritol, the best results having been recorded with bis(2,4-ditert-butylphenyl)pentaerythritol diphosphite.

It has been found, surprisingly, that the combined presence of an organic phosphite (d) and a sulfur-containing stabiliser (c) consisting of a combination (c3) such as defined above in the stabilised compositions according to the invention endows them with an exceptional resistance to the degrading action of washing products supplied in liquid form.

The principal function of the anti-acid agent (e), which may be incorporated in the stabilised compositions according to the invention, is to neutralise the possibly corrosive catalyst residues which may remain at variable concentrations in the polymer present in these compositions. The incorporation of this anti-acid agent may be particularly desirable in the case where the polymer present in these compositions is a propylene polymer prepared in the presence of a catalyst system containing, or whose preparation involves the presence of, a titanium chloride.

As examples of anti-acid agents, particular mention may be made of inorganic compounds of a basic nature, such as calcium, magnesium or zinc oxides and carbonates, and salts of these metals with saturated monocarboxylic aliphatic acids containing from 6 to 30 carbon atoms such as, for example, stearic, palmitic and 2-ethylhexanoic acids. Among all these agents, the use of zinc and calcium stearates is preferred, and more particularly that of calcium stearate, because it further improves the stability of the compositions.

The components (a), (b), (c) and optionally (d) and (e) are employed in the usual stabilising amounts. These amounts are usually between 0.001 and 10% by weight of the alpha-olefin polymers present in the composition, and preferably between 0.005 and 5%. More particularly, these amounts are between 0.01 and 1%.

When a metal sulfide (c21) is incorporated in the compositions, it has been noted, however, that the best results are recorded with amounts of this additive which are situated in the upper parts of the abovementioned ranges, in particular with amounts of the order of 1%.

In addition to the polymer or polymers, the components (a), (b) and (c) and the optional organic phosphite (d) and anti-acid agent (e), the stabilised compositions according to the invention may contain other usual additives such as, for example, other antioxidants, other polymers, processing agents, reinforcing agents, pigments, lubricants, filters, antistatic agents and the like.

The components (a), (b), (c) and optional (d) and (e), and the other optional additives may be incorporated in the polymer in any manner known per se, for example by impregnating the powdered or granular polymer with a solution of these components or by mixing a solution or a suspension of the polymer with a solution of these components. The incorporation may be carried out, for example, either in a mixer or a grinder where the solvent is evaporated off, or by milling on heated rolls or by extrusion of a mixture of the polymer and of these components. The stabilised compositions according to the invention may be processed by all the conventional processes for converting plastics, and more particularly by injection moulding. These compositions are suitable for the manufacture of all kinds of manufactured articles and more particularly injection-moulded parts.

The stabilised compositions according to the invention are characterised by a exceptional resistance to long-term oxidative degradation produced by the contact between articles manufactured therefrom and oxidising liquids, in particular hot oxidising liquids containing washing products of all kinds. Thus, these compositions resist exceptionally well not only the oxidising action of conventional powdered detergent products, but also the action of products containing indirect oxidants such as sodium hypochlorite (bleach) and the action of new liquid detergents which have recently appeared on the washing products market.

The invention is illustrated by the following examples:

EXAMPLE 1

A stabilised polyolefin composition was prepared by dry mixing the following components:

100 parts by weight of a block copolymer of propylene and ethylene containing approximately 8% by weight of polymerised ethylene, marketed by SOLVAY & Co. under the name ELTEX P RS001P;

0.03 part by weight of tetrakis(2,4-ditert-butylphenyl)-4,4'-diphenylenediphosphonite

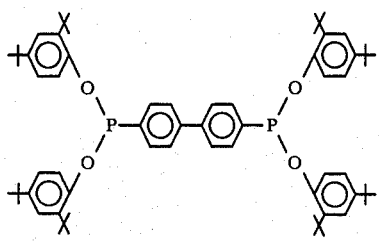

marketed by CIBA-GEIGY under the name Irgafos PEPQ;

0.1 part by weight of 21,2'-methylenebis(4-methyl-6-tert-butylphenol) terephthalate

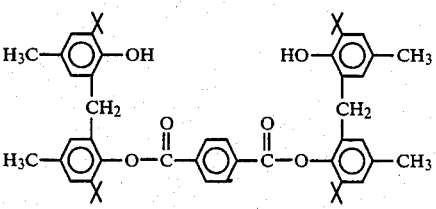

marketed by Société Francaise d'Organosynthése under the name HPM12;

0.15 part by weight of distearyl disulphide

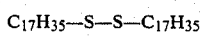

marketed by HOECHST under the name TMSE 10;

1 part by weight of zinc sulfide (Sachtolith HD product of SACHT LEBEN);

0.1 part by weight of bis(2,4-ditert-butylphenyl)pentaerythritol diphosphite

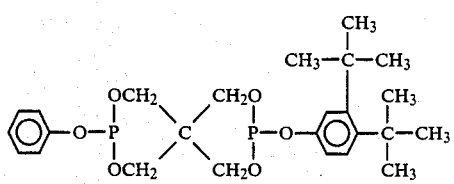

marketed by BORG-WARNER under the name Weston 626;

0.1 part by weight of calcium stearate (Radiastab 1060 product of OLEOFINA).

This stabilised composition (1) was granulated in a single-screw extruder and the granules were converted by injection moulding into small plaques 2 mm in thickness.

These small plaques were immersed for 500 hours in aqueous baths of the following washing products: (1) a bath containing bleach of 12° strength by chlorimetric titration, maintained at 60° C.; (2) a bath containing 10 g/l of liquid detergent under the trade mark "VIZIR" from PROCTOR & GAMBLE, maintained at 100° C.; (3) a bath containing 10 g/l of washing powder from HENKEL, maintained at 100° C.

The composition of these baths was renewed every 24 hours. After 500 hours' immersion, the plates, rinsed first, were placed in a ventilated oven at 150° C. and were inspected every 24 hours.

The time, expressed in days, at the end of which the plates became brittle, called "induction period" (IP) below, is shown in Table I and enables the efficiency of the stabilising formula to be evaluated in a satisfactory manner.

TABLE I

| Measurement of the IP after immersion of the plates for 500 hours in | | | |
|---|---|---|---|
| | bath (1) | bath (2) | bath (3) |
| IP (days) | 43 | 50 | 73 |

EXAMPLE 2

(Comparison)

A polyolefin composition stabilised in the same manner as in Example 1 was prepared, except that no zinc sulfide was included. The induction periods measured on plates which were moulded and oven-processed as in Example 1, after 500 hours' immersion, were 2 days, 35 days and 40 days, respectively, in the baths (1) to (3).

A considerable reduction in the IP and consequently accelerated degradation of the plates, are thus observed, particularly after immersion in bath (1) (bleach).

EXAMPLE 3

A stabilised polyolefin composition similar to that of Example 1 was prepared, except that the product HPM 12 was replaced by an equivalent quantity of tris(2,6-dimethyl-3-hydroxy-4-tert-butyl)benzyl isocyanurate

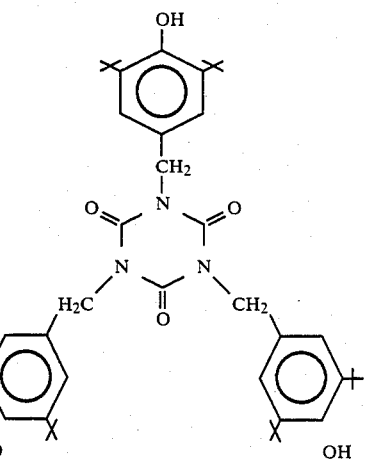

marketed by AMERICAN CYANAMID under the name Cyanox 1790.

The induction periods, measured as shown in Example 1, for small plates moulded from these compositions and immersed in the baths identified in Example 1, under the same conditions, are given in Table II below.

TABLE II

| | Measurement of the IP after immersion of the plaques for 500 hours in | | |
|---|---|---|---|
| | bath (1) | bath (2)* | bath (3)* |
| IP (days) | 37 | 70 | 83 |

*see Example 1

EXAMPLE 4

(Comparative)

A stabilised polyolefin composition was prepared in the same manner as in Example 3, except that no zinc sulfide was included. The induction periods measured for small plaques moulded and oven-processed as in Example 1, after 500 hours' immersion, were 2 days, 40 days and 58 days respectively, in the baths (1) to (3).

EXAMPLE 5

A stabilised polyolefin composition similar to that of Example 1 was prepared, except that distearyl disulfide was replaced by 0.3 part by weight of pentaerythritol tetrakis(3-thiododecylpropionate)

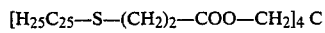

marketed by SHIPRO KASEI KAISHA under the name Seenox 412S.

The induction periods, measured as shown in Example 1, for small plaques moulded from this composition and immersed in the baths identified in Example 1, under the same conditions, are given in Table III below.

TABLE III

| | Measurement of the IP after immersion of the plaques for 500 hours in | | |
|---|---|---|---|
| | bath (1)* | bath (2)* | bath (3)* |
| IP (days) | 62 | 21 | 100 |

*see Example 1

EXAMPLE 6

A stabilised polyolefin composition similar to that of Example 5 was prepared, but without including zinc sulfide.

The induction periods, measured as shown in Example 1, for small plaques moulded from this composition and immersed in the baths identified in Example 1, under the same conditions, are given in Table IV below.

TABLE IV

| | Measurement of the IP after immersion of the plaques for 500 hours in | | |
|---|---|---|---|
| | bath (1)* | bath (2)* | bath (3)* |
| IP (days) | 55 | 30 | 70 |

*see Example 1

Comparison of the results of Examples 5 and 6 shows that the absence of zinc sulphide is not prejudicial in an unacceptable manner to the efficiency of the stabilising formulation when an ester derived from an aliphatic polyol and an alkylthiodipropionic acid (the product Seenox 412) is also present, in contrast to what occurs in the case of the combination of zinc sulfide with an organic polysulfide (comparison of the results of Example 1 and 3 respectively with the comparative Examples 2 and 4).

EXAMPLE 7

A stabilised polyolefin composition similar to that of Example 5 was prepared, except that the product Weston 626 was not included.

The induction periods, measured as shown in Example 1, for small plaques moulded from this composition and immersed in the baths identified in Example 1, under the same conditions, are given in Table V below.

TABLE V

| | Measurement of the IP after immersion of the plaques for 500 hours in | | |
|---|---|---|---|
| | bath (1)* | bath (2)* | bath (3)* |
| IP (days) | 67 | 22 | 104 |

*see Example 1

What is claimed is:

1. A composition stabilized against degradation by oxidizing liquids, comprising at least one alpha-olefin polymer containing:
   a phenolic antioxidant selected from among alkylated polyphenols and phenolic polyesters;
   a phosphonite selected from among polyphenylene diphosphonite and substituted derivatives thereof; and
   a sulfur-containing stabilizer selected from among
   (a) esters derived from aliphatic polyols and alkylthiodipropionic acids, and
   (b) at least one combination of zinc sulfide with an ester derived from aliphatic polyols and alkylthiodipropionic acids.

2. The stabilized composition according to claim 1, wherein the sulfur-containing stabilizer is selected from the at least one combination of zinc sulfide with an ester derived from aliphatic polyols and alkylthiodipropionic acids.

3. The stabilized composition according to claim 2, wherein the phenolic antioxidant is at least one alkylated polyphenol.

4. The stabilized composition according to claim 3, wherein the phosphonite is at least one polyphenylene diphosphonite.

5. The stabilized composition according to claim 4, wherein the at least one polyphenylene diphosphonite is selected from the group consisting of 4,4'-diphenylenediphosphonite, tetrakis (isooctyl)-4,4',4"-p-terphenylenediphosphonite, tetrakis (2,4-ditertbutylphenyl)-4,4',4"-p-terphenylenediphosphonite, and tetrakis (3-nonylphenyl)-4-4'-4"-p-terphenylenediphosphonite.

6. The stabilized composition according to claim 2, wherein the phenolic antioxidant is at least one phenolic polyester.

7. The stabilized composition according to claim 6, wherein the phosphonite is at least one polyphenylene diphosphonite.

8. The stabilized composition according to claim 7, wherein the at least one polyphenylene diphosphonite is selected from the group consisting of 4,4'-diphenylenediphosphonite, tetrakis (isooctyl)-4,4',4"-p-terphenylenediphosphonite, tetrakis (2,4-ditertbutylphenyl)-4,4',4"-p-terphenylenediphosphonite, and tetrakis (3-nonylphenyl)-4-4'-4"-p-terphenylenediphosphonite.

9. The stabilized composition according to claim 1, wherein the sulfur-containing stabilizer is selected from among esters derived from aliphatic polyols and alkylthiodipropionic acids.

10. The stabilized composition according to claim 9, wherein the phenolic antioxidant is at least one alkylated polyphenol.

11. The stabilized composition according to claim 10, wherein the phosphonite is at least one phenolic polyester.

12. The stabilized composition according to claim 1, additionally containing an organic phosphite.

13. The stabilized composition according to claim 12, wherein the organic phosphite is a cyclic diphosphite derived from pentaerythritol.

14. The stabilized composition according to claim 1, additionally containing an anti-acid agent.

15. The stabilized composition according to claim 14, wherein the anti-acid agent is calcium stearate.

16. The stabilized composition according to claim 1, wherein the composition comprises form 0.001 to 10% by weight, based on the weight of alpha olefin polymer, of said sulfur-containing stabilizer.

17. The stabilized composition according to claim 2, wherein the composition comprises from 0.001 to 10% by weight, based on the weight of alpha olefin polymer, of said sulfur-containing stabilizer.

18. The stabilized composition according to claim 3, wherein the composition comprises from 0.001 to 10% by weight, based on the weight of alpha olefin polymer, of said sulfur-containing stabilizer.

19. The stabilized composition according to claim 6, wherein the composition comprises from 0.001 to 10% by weight, based on the weight of alpha olefin polymer, of said sulfur-containing stabilizer.

20. The stabilized composition according to claim 9, wherein the composition comprises from 0.001 to 10% by weight, based on the weight of alpha olefin polymer, of said sulfur-containing stabilizer.

* * * * *